(12) United States Patent
Bank et al.

(10) Patent No.: US 11,331,803 B2
(45) Date of Patent: May 17, 2022

(54) MIXED REALITY ASSISTED SPATIAL PROGRAMMING OF ROBOTIC SYSTEMS

(71) Applicant: Siemens Aktiengesellschaft, Munich (DE)

(72) Inventors: Hasan Sinan Bank, Sacramento, CA (US); Naveen Kumar Singa, Plainsboro, NJ (US); Clifford Chou, Berkeley Heights, NJ (US); Xiaofan Wu, North Brunswick, NJ (US); Giuseppe Francesco Rigano, Acireale (IT); Simon Mayer, Graz (AT)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 16/500,954

(22) PCT Filed: Apr. 16, 2018

(86) PCT No.: PCT/US2018/027753
§ 371 (c)(1),
(2) Date: Oct. 4, 2019

(87) PCT Pub. No.: WO2018/194965
PCT Pub. Date: Oct. 25, 2018

(65) Prior Publication Data
US 2020/0030979 A1   Jan. 30, 2020

Related U.S. Application Data

(60) Provisional application No. 62/486,042, filed on Apr. 17, 2017.

(51) Int. Cl.
B25J 9/16    (2006.01)
B25J 13/08   (2006.01)

(52) U.S. Cl.
CPC ............ B25J 9/1671 (2013.01); B25J 13/08 (2013.01)

(58) Field of Classification Search
CPC ........ B25J 9/1671; B25J 9/1605; B25J 9/163; B25J 9/1664; B25J 13/08; G05B 2219/40131
(Continued)

(56) References Cited

U.S. PATENT DOCUMENTS

| 4,372,721 A | 2/1983 | Harjar et al. |
| 4,589,810 A | 5/1986 | Heindl et al. |

(Continued)

FOREIGN PATENT DOCUMENTS

WO   20160150907 A1   9/2016

OTHER PUBLICATIONS

J. Leitner, A. Förster and J. Schmidhuber, "Improving robot vision models for object detection through interaction," 2014 International Joint Conference on Neural Networks (IJCNN), Beijing, China, 2014, pp. 3355-3362.
(Continued)

*Primary Examiner* — Dalena Tran (57) ABSTRACT

A computer-based system and method is disclosed for spatial programming of a robotic device. A mixed reality tool may select an object related to one or more interactive tasks for the robotic device. A spatial location of the object may be located including Cartesian coordinates and orientation coordinates of the object. An application program may be executed to operate the robotic device using the spatial location. Based on initial parameters, execution of the one or more tasks by the robotic device on the object related to a skill set may be simulated in a mixed reality environment.

16 Claims, 7 Drawing Sheets

(58) Field of Classification Search
USPC .................................. 700/245, 264; 706/46
See application file for complete search history.

(56) References Cited

U.S. PATENT DOCUMENTS

| | | | |
|---|---|---|---|
| 6,282,460 | B2 | 8/2001 | Gilliland et al. |
| 6,445,964 | B1 | 9/2002 | White et al. |
| 8,696,458 | B2 | 4/2014 | Foxlin et al. |
| 10,896,543 | B2 * | 1/2021 | Kuffner ................... G06F 3/005 |
| 2001/0004718 | A1 | 6/2001 | Browne |
| 2008/0267450 | A1 * | 10/2008 | Sugimoto ............ A63H 17/395 382/103 |
| 2011/0029903 | A1 * | 2/2011 | Schooleman ........ H04N 13/239 715/764 |
| 2015/0239127 | A1 | 8/2015 | Barajas et al. |
| 2015/0331415 | A1 | 11/2015 | Feniello et al. |
| 2016/0257000 | A1 | 9/2016 | Guerin et al. |
| 2016/0297076 | A1 | 10/2016 | Riedel |

OTHER PUBLICATIONS

Levine, Sergey, et al. "End-to-end training of deep visuomotor policies." Journal of Machine Learning Research 17.39 (2016): 1-40.

Reddivari, H., et al. "Teleoperation control of baxter robot using body motion tracking." Multisensor Fusion and Information Integration for Intelligent Systems (MFI), 2014 International Conference on. IEEE, 2014.

Lambrecht, Jens, et al. "Spatial programming for industrial robots through task demonstration." International Journal of Advanced Robotic Systems 10.5 (2013): 254.

H. I. Lin, Y. Y. Chen and Y. Y. Chen, "Robot vision to recognize both object and rotation for robot pick-and-place operation," 2015 International Conference on Advanced Robotics and Intelligent Systems (ARIS), Taipei, 2015, pp. 1-6.

Gaschler, Andre, et al. "Intuitive robot tasks with augmented reality and virtual obstacles." Robotics and Automation (ICRA), 2014 IEEE International Conference on IEEE, 2014.

Ma, B., Thematic Investigating—Robot Revolution Global Robots & AI Primer, Dec. 16, 2015, Bank of America Merill Lynch Research.

T. Lozano-Perez, "Robot programming," in Proceedings of the IEEE, vol. 71, No. 7, pp. 821-841, Jul. 1983. doi: 10.1109/PROC. 1983.12681.

International Search Report dated Jul. 3, 2018; International Application No. PCT/US2018/0027753; Filing Date: Apr. 16, 2018; 13 pages.

Honig, Wolfgang, et al., "Mixed Reality for Robotics", 2015 IEEE/RSJ International conference on intelligent robots and systems (IROS), Sep. 28, 2015, pp. 5382-5387, XP032832406, DOI: 10.1109/IROS.2015.7354138 / Sep. 28, 2015.

* cited by examiner

MIXED REALITY ASSISTED SPATIAL PROGRAMMING OF ROBOTIC SYSTEMS

This application is a national phase filing under 35 U.S.C. § 371 of International Patent Application No. PCT/US2018/027753, filed Apr. 16, 2018, which claims the benefit of priority to U.S. Provisional Patent Application Ser. No. 62/486,042 filed Apr. 17, 2017, which are incorporated herein by reference in their entirety.

TECHNICAL FIELD

This application relates to automation and control. More particularly, this application relates to mixed reality assisted programming of robotic systems used in automation and control.

BACKGROUND

Teaching different skills to a robot brings many challenges such as the requirement of expert knowledge and effort, dependency of the robot manufacturer's software, integration of various programming languages/hardware, level of complexness of the tasks, and lack of efficient methods to seamlessly enable the programming of multiple robots, to name a few. Robotic task execution, which requires a combination of different skills, employs tools (e.g., direct programming environments, teaching pendants, motion trackers, or vision systems) to generate a control program. With these tools, users can create different types of tasks for the robots such as pick and place; 3D printing or machining of complex geometry; welding of components, etc.

Existing state-of-the-art techniques for programming robotic systems include code-based programming, teaching pendant, vision based systems, and motion tracking. Conventional code-based programming requires expert knowledge in robotics and programming languages (e.g. C++, Python) when programming robots to perform a particular task. For example, a user programs a sequence of actions for a robot to accomplish individual tasks, by analyzing input from sensors and utilizing pre-defined motions in the memory.

The teaching pendant approach has been developed as an improvement to code programming, applying common interfaces to program industrial robots for production, assembly, and transportation, to name a few. The main disadvantage of this technique includes repetition of the teaching process, lack of reusability, and proneness to inaccurate guidance due to the human factor.

Vision based systems employ a camera to provide image or video information for allowing a robot to perform tasks such as object recognition, path planning, obstacle avoidance, pick-and-place, etc. In general, vision-based programming is not able to capture the physical connections and dynamical interactions between robots and objects, which impedes trainability. Images used by the camera are in 2D space while the robot is operating in a 3D space. Bridging the gap between dimensions remains a significant challenge when relying on this programming approach.

Motion tracking provides an ability to learn a sequence of observed motions through the input of visual and non-visual sensors. Complex movement and realistic physical interactions, such as secondary motions, weight transfer, and exchange of forces, can be easily and accurately recreated by analyzing the input data from motion sensors. Typically, human motion tracking features low latency, and tracking systems operate close to soft or hard real-time. On the other hand, the cost of movement tracking equipment and its corresponding hardware/software are expensive and also require a highly-skilled technician to operate.

In general, the currently used approaches lack reusability, scalability, and transferability of the tasks, because the robots need to be reprogrammed if a different task is assigned.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Hereafter, the term "Mixed Reality" (MR) is used to describe a combined environment of real objects and virtual objects. Virtual objects may be simulated using MR, Augmented Reality (AR), or Virtual Reality (VR) techniques. For simplicity, the term MR is used in this disclosure.

Methods and systems are disclosed for a robotic programming platform that may teach a robotic system different skill sets through MR teaching tools. During a programming phase for a skill engine of the robotic device, spatial parameters related to interactive tasks with an object are learned for one or more skill sets. The disclosed methods and systems present an improvement to the functionality of the computer used to perform such a computer based task. While currently available tools may program a robotic device skill engine, the embodiments of the present disclosure enable the skill engine to be installed and connected to an MR environment, which has several advantages, including less dependability upon expert knowledge in specialized programming languages and scalability in accumulating skill sets for robotic devices.

Figure 1:
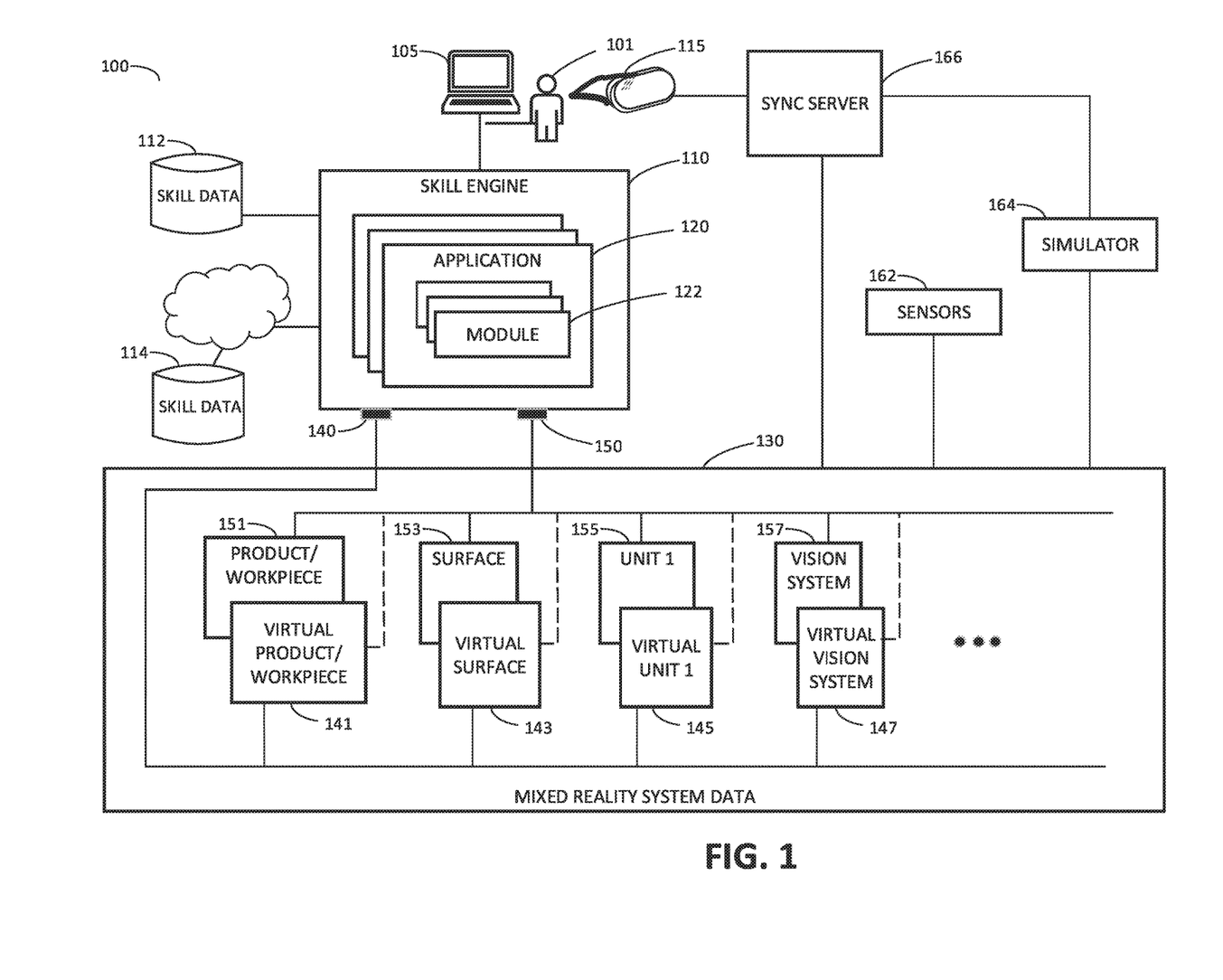
FIG. 1 shows an example of a system of computer based tools according to embodiments of this disclosure.

FIG. 1 shows an example of a system of computer based tools according to embodiments of this disclosure. In an embodiment, a user 101 may wear a mixed reality (MR) device 115, such as Microsoft HoloLens, while operating a graphical user interface (GUI) device 105 to train a skill engine 110 of a robotic device. The skill engine 110 may have multiple application programs 120 stored in a memory, each program for performing a particular skill of a skill set or task. For each application 120, one or more modules 122 may be developed based on learning assisted by MR tools, such as MR device 115 and MR system data 130. As the application modules 122 are programmed to learn tasks for robotic devices, task parameters may be stored as local skill data 112, or cloud based skill data 114.

The MR device 115 may be a wearable viewing device that can display a digital representation of a simulated object on a display screen superimposed and aligned with real objects in a work environment. The MR device 115 may be configured to display the MR work environment as the user 101 monitors execution of the application programs 120. The real environment may be viewable in the MR device 115 as a direct view in a wearable headset (e.g., through a transparent or semi-transparent material) or by a video image rendered on a display screen, generated by an internal or external camera. For example, the user 101 may operate the MR device 115, which may launch a locally stored application to load the virtual aspects of the MR environment and sync with the real aspects through a sync server 166. The sync server 166 may receive real and virtual information captured by the MR device 115, real information from sensors 162, and virtual information generated by simulator 164. The MR device 115 may be configured to accept hand gesture inputs from user 101 for editing, tuning, updating, or interrupting the applications 120. The GUI device 105 may be implemented as a computer device such as a tablet, keypad, or touchscreen to enable entry of initial settings and parameters, and editing, tuning or updating of the applications 120 based on user 101 inputs. The GUI device 105 may work in tandem with the MR device 115 to program the applications 120.

MR system data 130 may include various digital and analog signals and quadrature pulses received from various sensors 162, as well as other types of devices such as switches, high speed counters, or a combination thereof. Examples of sensor types may include one or more of motion, vibration, temperature, rotary speed, pressure, optic, and audio. Such data from actual sensors is referred as "real data" hereafter to distinguish from virtual data obtained from simulated entities or digital twins of the physical components. As shown in FIG. 1, real product/workpiece data 151 may include signals related to any sensing, switching or counting devices used for tracking and monitoring a product or workpiece in the work environment. For example, perception sensors may be installed in a work area for monitoring and tracking of the product/workpiece. Other examples of real data include real surface data 153 related to a work surface for the workpiece, real unit 1 data related to a robotic device, such as a robotic gripper that can interact and operate with the product/workpiece, and real vision system data 157 related to visual sensing devices, such as a camera. Real data is received by the skill engine 110 at input module 150, which may be configured as separate modules for each respective input signal, and may convert the signals to input information useable by the application.

The MR system data 130 may include virtual data related to characteristics of simulated components of the MR environment. Simulator 164 may generate virtual data in the format of simulated signals such as the analog, digital or pulse signals as described for the real data. The virtual data may also be provided to the skill engine 110 in a format already converted to information useable by the application 120. One or more input modules 140 may be configured to receive the virtual data in either format. In one embodiment, the virtual data may be sent to the skill engine 110 via input module 150, or divided and sent via both input modules 140 and 150. As shown in FIG. 1, virtual product/workpiece data 141 may include any signals or information related to a simulation of the product or workpiece as produced by the MR device 115 or a separate MR simulator 164. For example, virtual product/workpiece data 141 may include reactive motion responsive to the simulated environment, which may be translated into a visual representation 160 of the virtual product/workpiece for presentation in MR device 115. Simulator 164 may generate a simulation of the surface for a workpiece and store as virtual surface data 143. Simulator 164 may also generate simulated activity of the virtual unit 1 according to various parameters, which may be stored as virtual unit 1 data. Virtual vision system data 147 may be based on simulated perceptions of a digital twin.

Through MR tools, such as the MR device 115, the user 101 may be presented with options for selecting which entities of the MR environment are to be simulated as digital twins. Having real data/virtual data combinations allows for various simulations of the MR environment. For example, in a real-virtual mode, the skill engine 110 may process the MR system data 130 for one or more real components simultaneously with data for one or more virtual components when developing and programming the application modules 122. For example, a real product may be present in the MR environment and virtual workpiece may be simulated to coexist with the real product during a simulation of interaction between the product and the workpiece. In this case, real product data 151 includes sensor signals received from sensors reactive to activity of the real product, and virtual workpiece data 141 includes signals and information produced in reaction to activity and behavior of the simulated workpiece. In an embodiment, control sensors 162 associated with a robotic unit 1 may produce real unit 1 data 155. For example, motion sensors may provide signals to analyze maximum speed thresholds for robotic components.

The MR system data 130 may be processed in a virtual-virtual mode in which one or more digital twins respond to a corresponding application program module 122 and simulate activity or operations tracked by the MR device 115 or an MR simulator 164 to produce corresponding virtual data inputs to the skill engine 110, and a visual simulation displayed on the MR device 115.

As another example, the MR system data 130 may be processed in a real-real mode, where only real components interface with actual sensors and with the corresponding application modules 120. In such case, the MR device 115 may provide display of one or more simulated structures or objects within the work environment, such as products or workpieces or obstacles during testing and commissioning of the automation installation. The MR device 115 may also display a simulated path or movement of a real component as a visual prediction displayed to the user 101 prior to the actual path or movement. Such a prediction may be useful to make adjustments to the physical plant or to the skill set application prior to the actual operation on the real objects.

In an embodiment for using MR tools for spatial programming of a robotic device controlled by a programmable logic controller (PLC), the knowledge about the control system manipulated during the design and engineering phase, and stored as skill data 112/114, may include one or more of the following: connectivity between devices; sensors and actuators, inputs and outputs for devices and device connectivity; functions, function blocks, organization blocks, programs, processes, and logical relationships amongst them; control variable names and address assignment of variables to specific programs and processes on one side and devices on the other side; data types and variable types (e.g., global, direct, I/O, external, temporary, time etc.); and explanation and justification of control logic, control loops, control structure in the control program in form of comments and notes; and auxiliary code used for testing, observing, tracing, and debugging a by a portal such as GUI 105 in conjunction with interface to the MR device 115 in accordance with the embodiments of the disclosure.

While particular real-virtual combinations of MR system data 130 have been shown and described, other embodiments may include various other kinds of data alternatively or additionally, depending on the number and type of control components to be simulated for development of the application programs 120.

Figure 2:
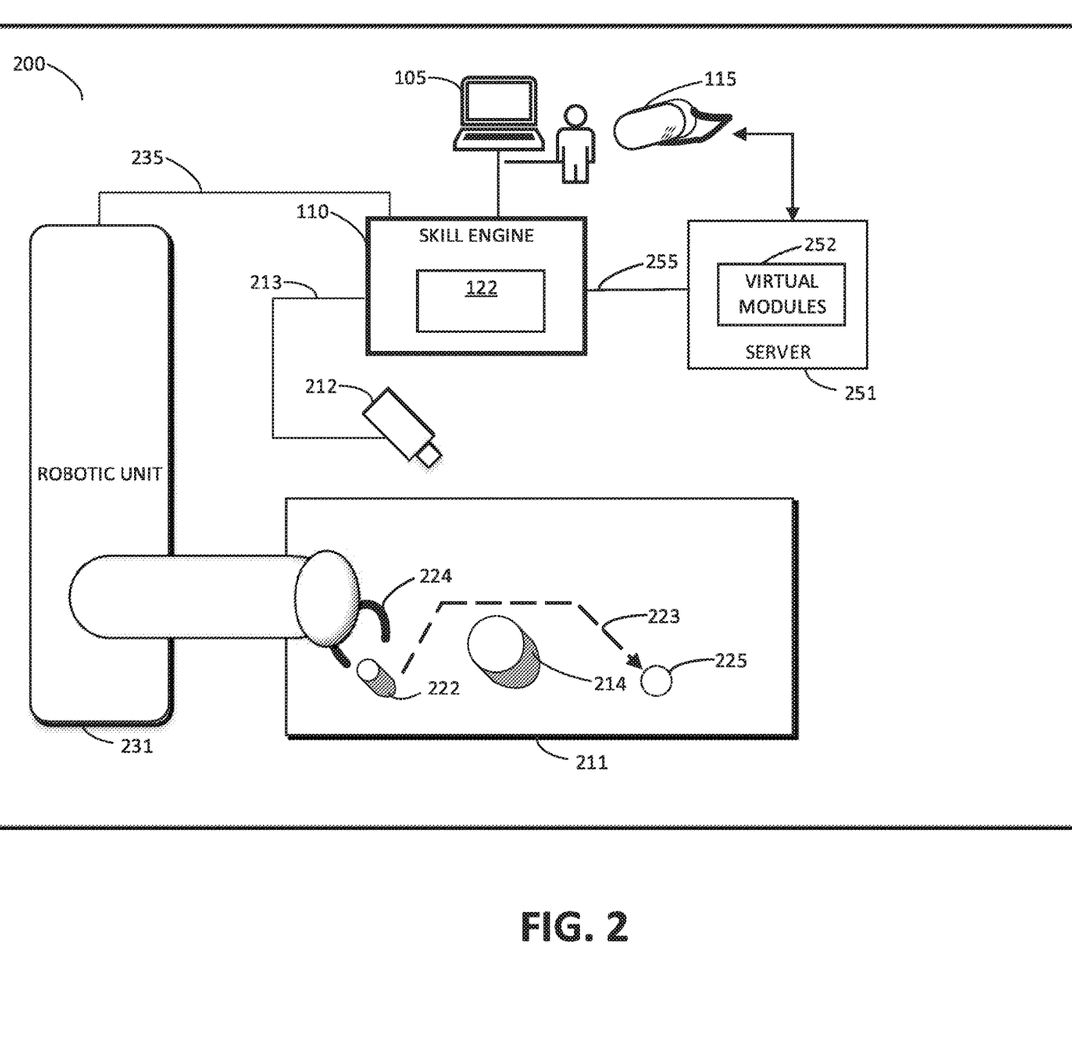
FIG. 2 shows an example configuration of a mixed reality environment according to embodiments of the disclosure.

FIG. 2 shows an example configuration of an MR environment 200 according to embodiments of the disclosure. A skill engine 110 controls a robotic unit 231 and receives sensor inputs 235, such as spatial position and orientation data. Objects 222 and 214 may be disposed on a work surface 211 to be operated upon by robotic unit 231. Server 251, such as the simulator 164 shown in FIG. 1, may include one or more processors to execute virtual modules 252 to generate digital twins for simulation of real counterparts, such as robotic unit 231, and objects 222, 214. For example, the virtual modules 252 may render a display of a simulated robotic unit 231, as a digital representation of an actual robotic unit 231, with identical spatial dimensions and motion characteristics related to skills and tasks assigned to the robotic unit and executed by application programs of the skill engine 110. The rendering of the simulation by the virtual modules 252 may be displayed to the user in the MR device 115. Virtual control data, such as sensor simulations, are fed to the skill engine 110 via data input 255. Visual sensor data from sensor 212 may provide visual information related to activity of real versions of robotic unit 231 and objects 222, 214. Simulation data provided by virtual modules 252 may be generated using tools such as Siemens LMS Virtual Lab, or the like.

The robotic unit 231 may be programmed to perform various tasks as parts of skill sets related to interaction with an object 222, such as a product, a subcomponent of a product, a workpiece, or a tool. For example, robotic unit 231 may be programmed to perform a packaging operation, cutting, drilling, grinding, or painting on object 222, depending on the particular installation and configuration of the robotic unit 231. As an illustrative example, robotic unit 231 is shown in FIG. 2 being equipped with a gripper 224 for a pick and placement operation on object 222, such as in a packaging operation of an automation process. In an embodiment, robotic unit 231 may pick object 222 up from work surface 211, plan a path 223 to target location 225 that avoids collision with obstacle object 214.

In an embodiment, MR device 115 may render and display a virtual robotic unit 231 and virtual gripper 224, representing an MR simulation. The virtual robotic unit 231 and virtual gripper 224 may be simulated in virtual modules 252 to move a virtual workpiece 222 along a path 223 on a real table 211 for a collision avoidance application program. The visual sensor 212, such as a camera, may provide input to the skill engine 110 to provide an MR input that represents the optics for the real components, such as table 211 and a real object 214. The MR device 115 may be equipped with a camera that could also provide visual data of real objects. The visual data from visual sensor 212 may also be provided to the MR device 115 via a wired or wireless connection for an MR display of the simulated operation in section 210, which enables remote viewing of the simulated operation.

For the example simulation, the real object 214 may act as an obstacle for the virtual workpiece 222. For an initial programming of a spatial-related application, the MR device 115 may be used to observe the path of the virtual workpiece as it travels along a designed path 223 to a target 225. The user 101 may initially setup the application program using initial parameters to allow programming of the application. For example, the initial spatial parameters and constraints may be estimated with the knowledge that adjustments can be made in subsequent trials until a spatial tolerance threshold is met. Entry of the initial parameters may be input via the GUI device 105 or by an interface of the MR device 115. Adjustments to spatial parameters of the virtual robotic unit 231 and object 222 may be implemented using an interface tool displayed by the MR device 115. For example, spatial and orientation coordinates of the virtual gripper 224 may be set using a visual interface application running on the MR device 115. As the simulated operation is executed, one or more application modules 122 may receive inputs from the sensors, compute motion of virtual robotic unit 231 and/or gripper 224, monitor for obstacles based on additional sensor inputs, receive coordinates of obstacle object 214 from the vision system 212, and compute a new path if necessary. Should the virtual workpiece fail to follow the path 223 around the obstacle object 214, the user may interrupt the simulation, such as by using a hand gesture with the MR device 115, then modify the application using GUI 105 to make necessary adjustments.

The MR simulation may be rerun to test the adjusted application, and with additional iterations as necessary, until operation of the simulated robotic unit 231 is successful according to constraints, such as a spatial tolerance threshold. For example, the path 223 may be required to remain within a set of spatial boundaries to avoid collision with surrounding structures. As another example, the placement of object 222 may be constrained by a spatial range surrounding target location 225 based on coordination with subsequent tasks to be executed upon the object 222.

The MR simulation may be rerun to test the adjusted application, and with additional iterations as necessary, until the simulated operation of the robotic device is successful. The above simulation provides an example of programming the robotic device to learn various possible paths, such as a robotic arm with gripper, for which instructions are to be executed for motion control in conjunction with feedback from various sensor inputs.

Figure 3:
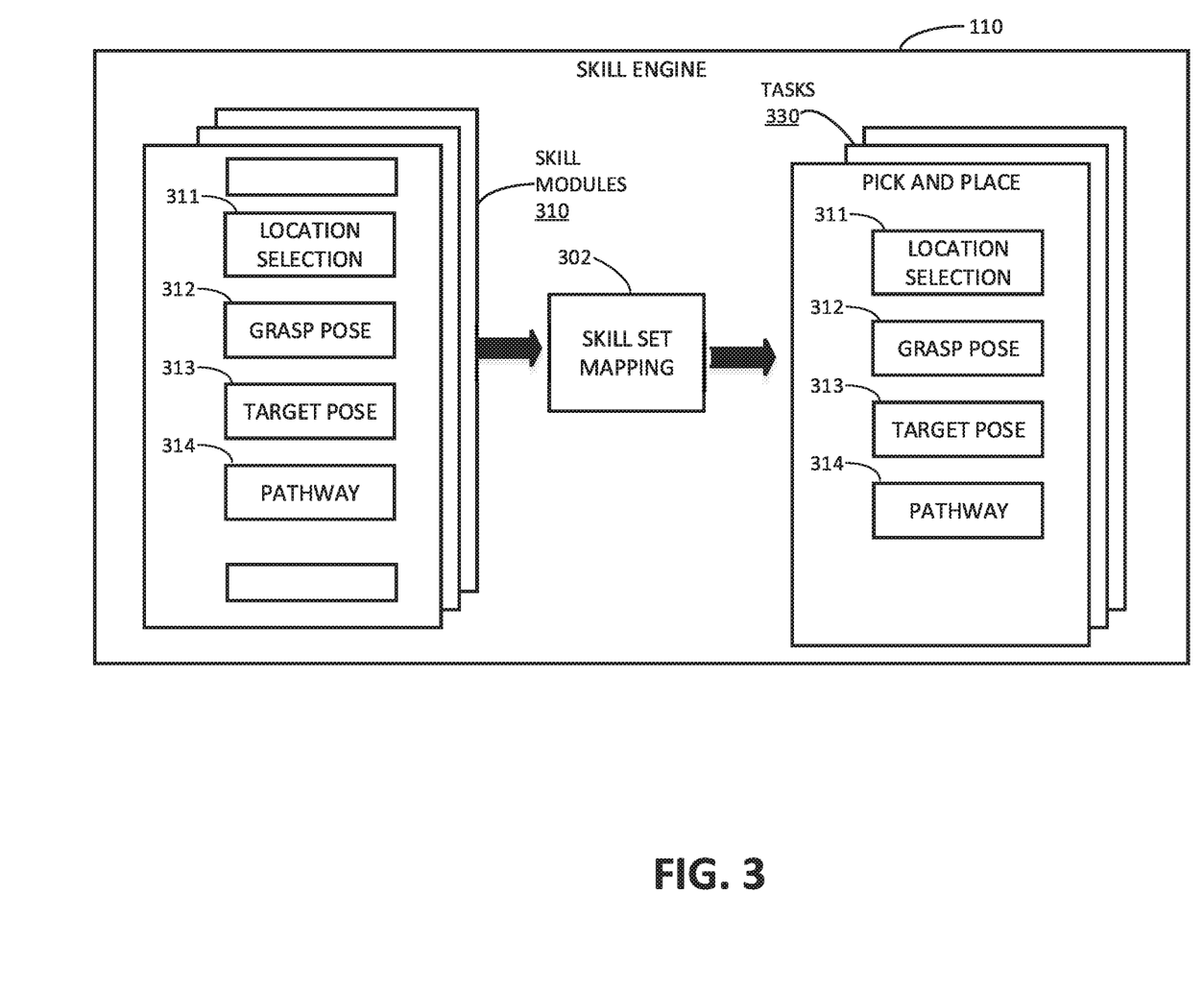
FIG. 3 shows a diagram of a skill engine architecture according to an embodiment of the disclosure.

FIG. 3 shows a diagram of a skill engine architecture according to an embodiment of the disclosure. In an embodiment, a memory in the skill engine 110 may include one or more software applications or programs with multiple skill modules 310 for programming by the MR device 115. A skill set mapping module 302 may identify skills related to various tasks for the robotic device, and map the skill sets to task applications 330. For example, skills for location selection 311, grasp pose 312, target pose 313 and pathway 314 may be mapped to a pick and place task as shown in FIG. 3. Various other learned skills may be mixed and mapped for different tasks 330 of the robotic device as determined by the skill set mapping module 302. In an embodiment, a location selection module 311 may encoded to receive information from the MR device 115 related to spatial coordinates of a first location for the object to be grasped by the gripper of the robotic unit, orientation coordinates of the object, and spatial coordinates of a second location related to the target location for placement of the object. The location selection module 311 may include spatial constraints to prohibit selections from areas defined to be restricted for any reason, and may execute an indication transmission to the user to accept or deny a location selection. A grasp pose module 312 may be encoded to receive spatial and orientation parameters of the gripper relative to the spatial coordinates of the object, such that the gripper may be correctly positioned for the grasp. The grasp pose module 312 may include constraints, such as constraints based on limitations of the gripper according to stored design information. A target pose module 313 may be encoded to receive spatial and orientation parameters of the gripper relative to the spatial coordinates of the target location, such that the gripper may be correctly positioned for a release of the object onto the work surface. The target pose module 313 may include constraints, such as constraints based on limitations of the gripper according to stored design information. The pathway planning module 314 may include instructions and coding related to operating the gripper used to move an object along a path within a workspace using the grasp pose spatial coordinates and the target pose spatial coordinates. In accordance with the above, during simulation of a virtual robotic unit and gripper performing a pick and place operation, the task application program for controlling the gripper may receive inputs from each of the modules 311/312/313/314 related to spatial coordinates of object, grasp, path, and target release.

Learned skills and tasks may be uploaded to a local database or a cloud database (e.g., Siemens MindSphere). When assigned a task, the robotic device may autonomously combine different skills from the database using the skill set mapping module 302 and automatically execute the task. This cloud-based skill programming of the robots, together with autonomous task planning framework, provide a multi-robot programming platform that significantly improves reusability and transferability.

Figure 4:
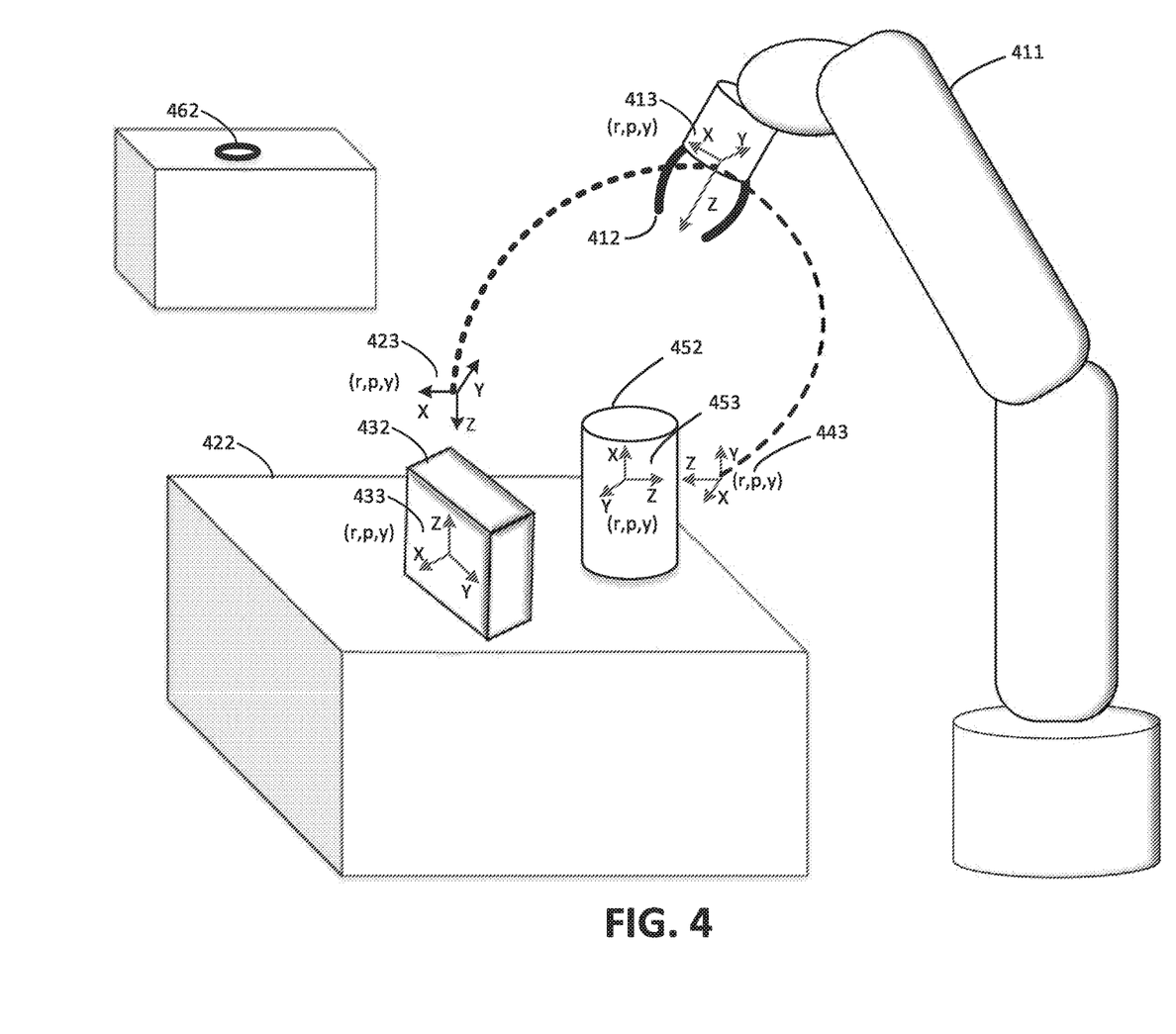
FIG. 4 is a diagram of an example of spatial programming for grasp poses of a robotic device in accordance with embodiments of the disclosure.

FIG. 4 is a diagram of an example of spatial training and programming for grasp poses of a robotic device in accordance with embodiments of the disclosure. In this illustrative example, a robotic device 411 is shown equipped with a gripper 412 and a control program is to be executed to learn a pick and place task for the robotic device 411, moving an object 432, 452 from surface 422 to a target location 462. Each of the entities 411, 412, 432, 452, 422, 462 shown in FIG. 4 may be real or virtual. With reference to FIG. 3, the programming may begin with the location module 311 receiving user instructions via the MR device by selecting an object, such as cuboid object 432, and the target location 462. The MR device may provide visual confirmation to the user, such as by a colored highlighting of the selected object 432 and the selected target 462, as acknowledgement that the system has loaded the selections. The location selection module 311 may then determine the spatial location of the selected object and target using visual sensors, such as the MR device 115 or the visual sensor 212 shown in FIG. 2. The cuboid object 432 has a spatial location 433, which may include Cartesian coordinates (x,y,z) and orientation coordinates roll, pitch and yaw (r, p, y). The grasp pose module 312 may identify an initial spatial location 413 for the gripper 412, which may include Cartesian coordinates (x,y,z) and orientation coordinates (r, p, y). Using visual sensors, such as the MR device 115 or the visual sensor 212 of FIG. 2, a relative a grasp pose spatial location 423 can be calculated by the grasp pose module 312, including Cartesian coordinates and orientation coordinates, based on the spatial location 433 of object 432. In a similar manner, location selection module 311 may determine spatial location 453 for a cylindrical object 452, and grasp pose module 312 may calculate a grasp pose spatial location 443 for the gripper 412. In this example, grasp pose module 312 determines that the optimal orientation coordinates for the grasp pose spatial location 443 are based on a grasp point along the side of the object 452, instead of the top of the object as with the cuboid object 432.

Figure 5:
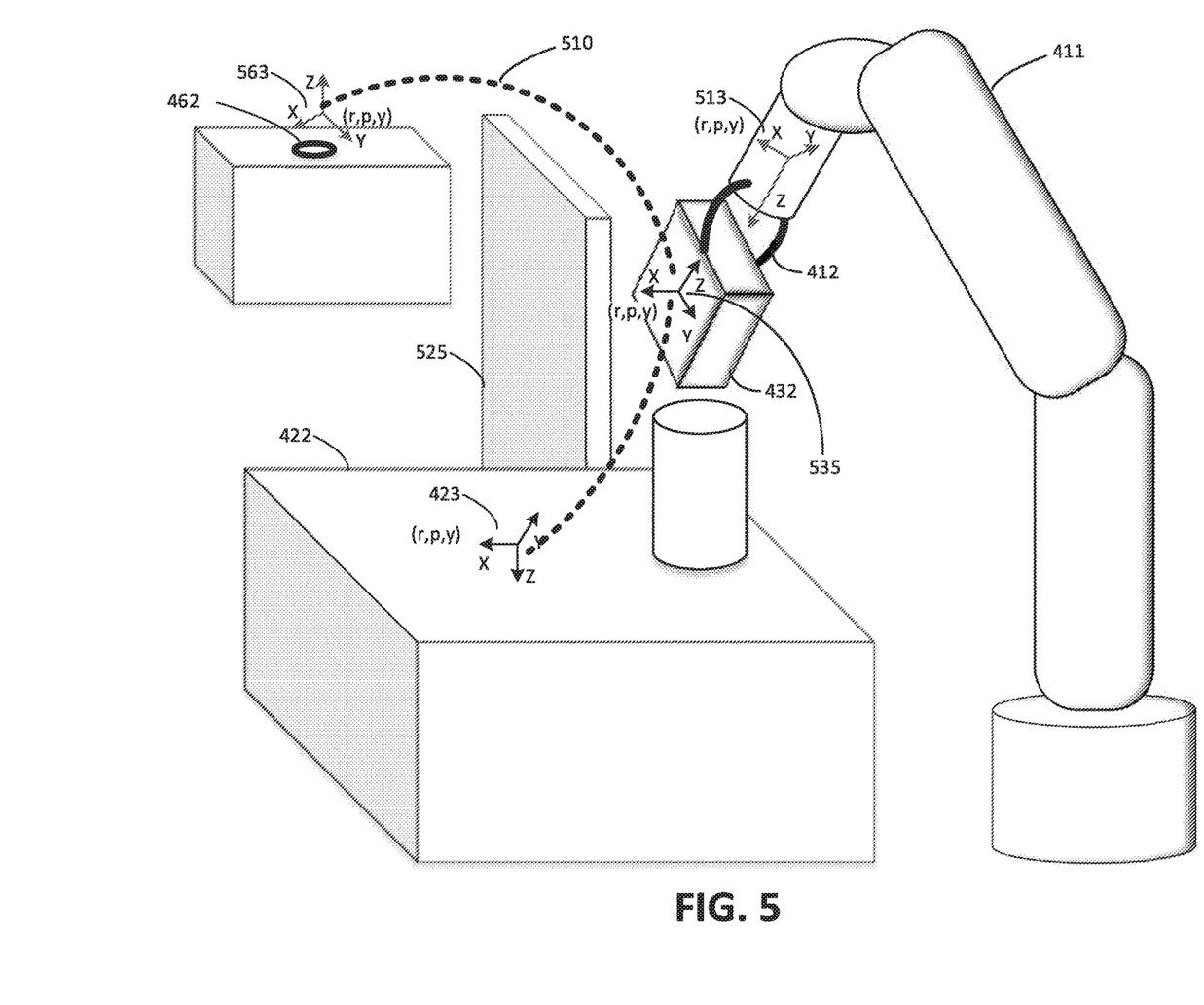
FIG. 5 is a diagram of an example of spatial programming for pathway of a robotic device in accordance with embodiments of the disclosure.

FIG. 5 is a diagram of an example of spatial training and programming for pathway of a robotic device in accordance with embodiments of the disclosure. The pathway module 314 may calculate a path 510 to avoid obstacles, such as object 525, based on the knowledge of grasp pose spatial location 423 and target pose spatial location 563. Interim poses, such as pose spatial location 535, may also be calculated as needed along the path 510.

Figure 6:
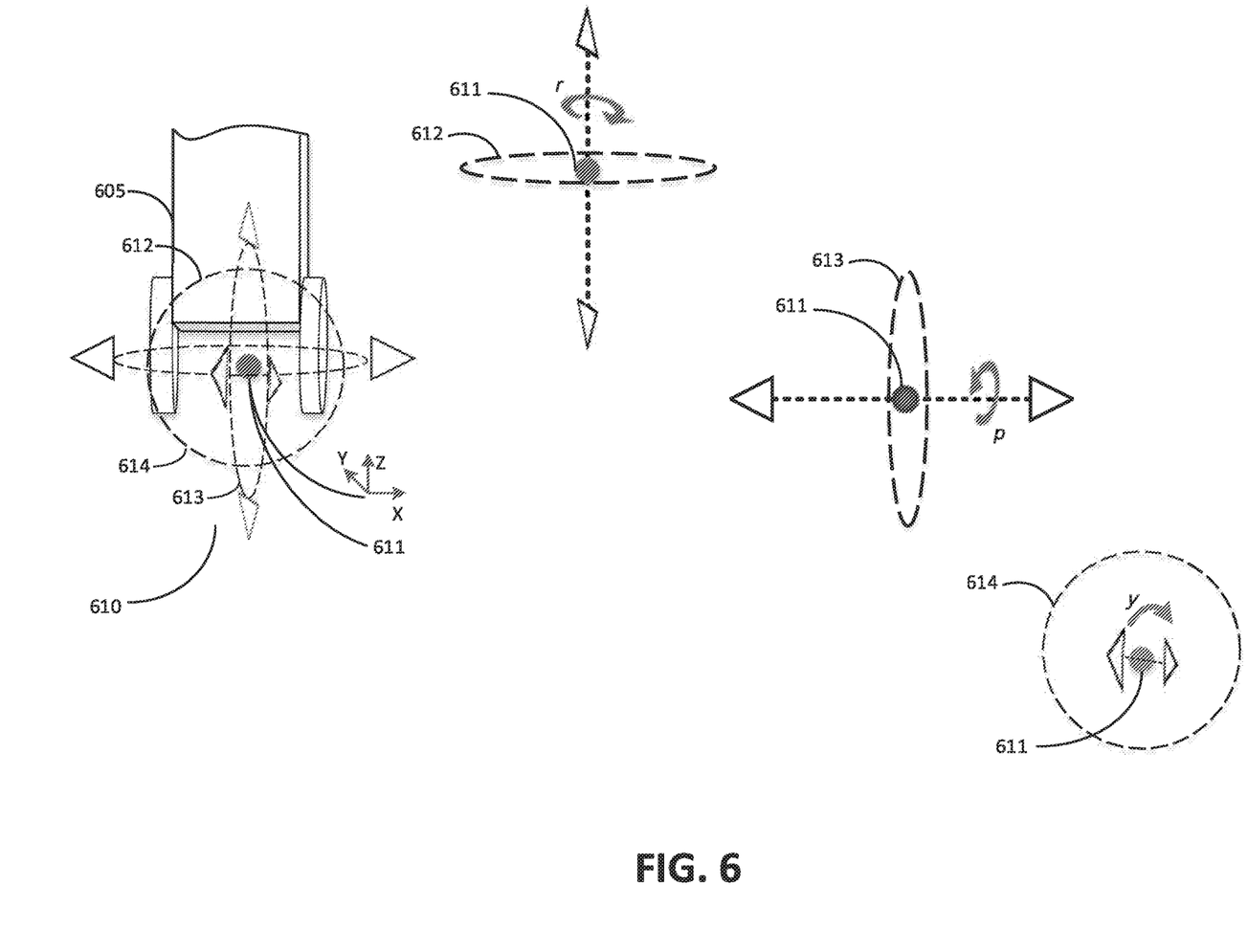
FIG. 6 shows an example of an interface to adjust spatial coordinates for a robotic device using an MR tool in accordance with embodiments of the disclosure.

FIG. 6 shows an example of an interface to adjust spatial coordinates for a robotic device using an MR tool in accordance with embodiments of the disclosure. The MR device 115 may include a visual interface to assist the user when making adjustments to spatial settings for the robotic device. As an illustrative example, the graphical interface 610 includes a spherical triad 611, which can be controlled according to Cartesian coordinates x, y, z and orientation coordinates r,p,y. As shown, orientation coordinate r controls roll along an axis of an orbital path 612, orientation coordinate p controls pitch along an axis of an orbital path 613, and orientation coordinate y controls yaw along an axis of an orbital path 614. Using visual, tactic or gesture cues of the user, the MR device 115 may record selections for adjustments to poses for the robotic device, for any skill or task programming.

In contrast to conventional robot programming techniques requiring programming and special hardware, the methods and systems of this disclosure do not rely on an operator having computer science background or coding experience. Hence, training and programming costs and production time are reduced for industrial applications for both continuous and discrete manufacturing, such as mechanical and electronic assembly, freight handling, welding, 3D printing automation, and the like. The embodiments described herein provide robustness and stability to robotic training and programming, and results are less prone to error than deep learning solutions.

Figure 7:
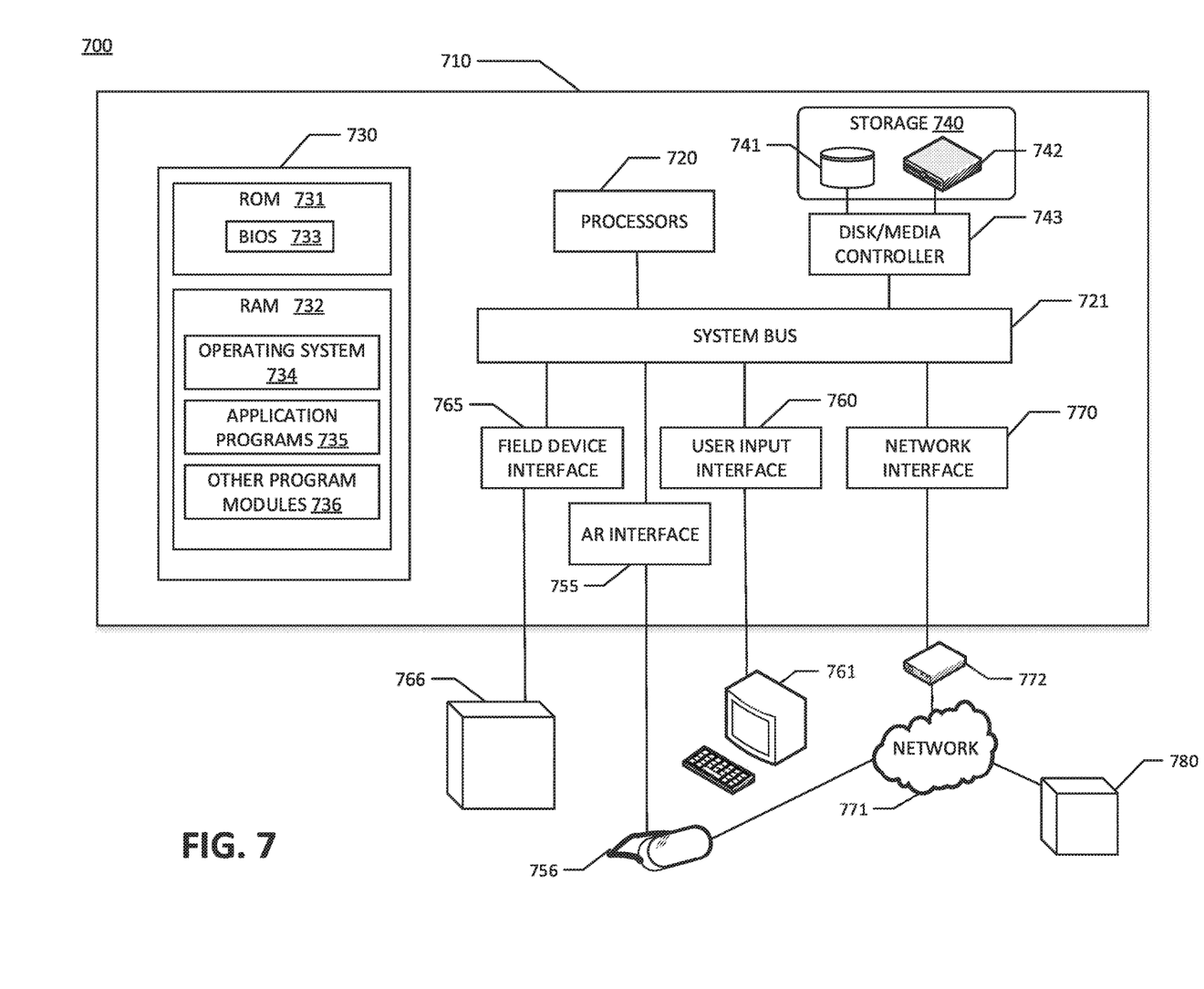
FIG. 7 illustrates an example of a computing environment within which embodiments of the disclosure may be implemented.

FIG. 7 illustrates an example of a computing environment within which embodiments of the present disclosure may be implemented. A computing environment 700 includes a computer system 710 that may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 720 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 721 may include at least one of a system bus, a memory bus, an address bus, or a message bus, and may permit exchange of information (e.g., data (including computer-executable code), signaling, etc.) between various components of the computer system 710. The system bus 721 may include, without limitation, a memory bus or a memory controller, a peripheral bus, an accelerated graphics port, and so forth. The system bus 721 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 7, the computer system 710 may also include a system memory 730 coupled to the system bus 721 for storing information and instructions to be executed by processors 720. The system memory 730 may include computer readable storage media in the form of volatile and/or nonvolatile memory, such as read only memory (ROM) 731 and/or random access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, and other program modules 736. For example, the application programs 735 may include application programs 120 and application programs used to run on the MR device 115 as shown in FIG. 1 and described herein. Application programs 735 may also include a user portal for development of the application program, allowing input parameters to be entered and modified as necessary.

The operating system 734 may be loaded into the memory 730 and may provide an interface between other application software executing on the computer system 710 and hardware resources of the computer system 710. More specifically, the operating system 734 may include a set of computer-executable instructions for managing hardware resources of the computer system 710 and for providing common services to other application programs (e.g., managing memory allocation among various application programs). In certain example embodiments, the operating system 734 may control execution of one or more of the program modules depicted as being stored in the data storage 740. The operating system 734 may include any operating system now known or which may be developed in the future including, but not limited to, any server operating system, any mainframe operating system, or any other proprietary or non-proprietary operating system.

The computer system 710 may also include a disk/media controller 743 coupled to the system bus 721 to control one or more storage devices for storing information and instructions, such as a magnetic hard disk 741 and/or a removable media drive 742 (e.g., floppy disk drive, compact disc drive, tape drive, flash drive, and/or solid state drive). Storage devices 740 may be added to the computer system 710 using an appropriate device interface (e.g., a small computer system interface (SCSI), integrated device electronics (IDE), Universal Serial Bus (USB), or FireWire). Storage devices 741, 742 may be external to the computer system 710.

The computer system 710 may also include a field device interface 765 coupled to the system bus 721 to control a field device 766, such as a device used in a production line. The computer system 710 may include a user input interface or GUI 761, which may comprise one or more input devices, such as a keyboard, touchscreen, tablet and/or a pointing device, for interacting with a computer user and providing information to the processors 720.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium of storage 740, such as the magnetic hard disk 741 or the removable media drive 742. The magnetic hard disk 741 and/or removable media drive 742 may contain one or more data stores and data files used by embodiments of the present invention, such as the virtual data 141, 143, 145, 147, and skill data 112. The data store 740 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 720 may also be employed in a multi-processing arrangement to execute the one or more sequences of instructions contained in system memory 730. In alternative embodiments, hardwired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 700 may further include the computer system 710 operating in a networked environment using logical connections to one or more remote computers, such as remote computing device 780. The network interface 770 may enable communication, for example, with other remote devices 780 or systems and/or the storage devices 741, 742 via the network 771. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

It should be appreciated that the program modules, applications, computer-executable instructions, code, or the like depicted in FIG. 7 as being stored in the system memory 730 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 710, the remote device 780, and/or hosted on other computing device(s) accessible via one or more of the network(s) 771, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices. The remote device 780 may store the virtual modules 252 shown in FIG. 2, or the skill data 112, 114 as shown in FIG. 1.

It should further be appreciated that the computer system 710 may include alternate and/or additional hardware, software, or firmware components beyond those described or depicted without departing from the scope of the disclosure. More particularly, it should be appreciated that software, firmware, or hardware components depicted as forming part of the computer system 710 are merely illustrative and that some components may not be present or additional components may be provided in various embodiments. While various illustrative program modules have been depicted and described as software modules stored in system memory 730, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-based method for spatial programming of a robotic device, the method comprising:
   selecting, by a mixed reality tool, entities of a mixed reality environment for simulation as simulated entities;
   selecting, by the mixed reality tool, an object related to one or more interactive tasks for the robotic device;
   determining, by a skill engine, a spatial location of the object including Cartesian coordinates and orientation coordinates of the object;
   executing an application program to operate the robotic device using the spatial location;
   simulating, in-a the mixed reality environment, execution of the one or more interactive tasks by the robotic device on the object related to a skill set, the execution based on initial parameters;
   receiving system data from the mixed reality environment comprising virtual data related to characteristics of the simulated entities and real data from one or more real components of the mixed reality environment;
   processing the received system data for various simulations of the mixed reality environment in each of a set of modes, including:
      a real-real mode in which only the real components interface the application program,
      a virtual-virtual mode in which one or more simulated entities respond to the application program and simulate activity or operations tracked by the mixed reality tool to produce virtual data inputs to the skill engine, and
   a real-virtual mode in which the skill engine processes the system data for one or more of the real components simultaneously with data for one or more of the simulated entities; and
   iteratively performing the following steps until a convergence of parameters is achieved for execution of the one or more tasks within spatial tolerance thresholds:
      modifying, by the mixed reality tool, the initial parameters in response to gesture inputs received from a user; and
      repeating the simulating of the execution of the one or more tasks using the modified parameters.

2. The method of claim 1, further comprising:
   receiving an indication of an acceptable simulated execution of the one or more tasks based on the convergence of parameters;
   mapping the skill set to the parameters corresponding to the indication; and
   uploading the mapping to a database.

3. The method of claim 1, further comprising:
displaying an indication to confirm selection of the object.

4. The method of claim 1, wherein the skill set includes a task of grasping the object, and the simulating comprises:
setting a grasp pose for a gripper of the robotic device relative to the Cartesian coordinates and the orientation coordinates of the object, wherein the grasp pose includes relative Cartesian coordinates and orientation coordinates; and
displaying a virtual representation of the robotic device performing a simulated grasp of the object based on the grasp pose in the mixed reality environment.

5. The method of claim 1, wherein the skill set includes a task of placing the object, and the simulating comprises:
selecting a target location related to placement of the object;
displaying a virtual marker at the target location;
determining Cartesian coordinates and orientation coordinates of the target location;
setting a release pose for a gripper of the robotic device relative to the Cartesian coordinates and the orientation coordinates of the target location, wherein the grasp release pose includes relative Cartesian coordinates and orientation coordinates; and
displaying a virtual representation of the robotic device performing a simulated placement of the object onto the target location based on the release pose in the mixed reality environment.

6. The method of claim 5, further comprising:
displaying an indication to confirm selection of the target location.

7. The method of claim 5, wherein the skill set includes an obstacle avoidance task for a pathway the object, and the simulating comprises:
identifying any obstacles between the location of the object and the target location;
setting a pathway between the location of the object and the target location that avoids contact with the identified obstacles; and
displaying a virtual representation of the robotic device performing a simulated movement of the object along the pathway in the mixed reality environment.

8. The method of claim 1, wherein the mixed reality environment comprises one or more of the robotic device, the object, and the target being simulated by a virtual representation.

9. A system comprising:
a mixed reality tool configured to select entities of a mixed reality environment for simulation as simulated entities, and select an object related to one or more interactive tasks for the robotic device;
a skill engine for an automation system, the skill engine comprising an application program comprising a first module configured to determine a spatial location of the object including Cartesian coordinates and orientation coordinates of the object, and a second module configured to execute an application program to operate the robotic device using the spatial location; and
a simulator configured to:
simulate, in the mixed reality environment, execution of the one or more tasks by the robotic device on the object related to a skill set,
receive system data from the mixed reality environment comprising virtual data related to characteristics of the simulated entities and real data from one or more real components of the mixed reality environment, and
process the received system data for various simulations of the mixed reality environment in each of a set of modes, including:
a real-real mode in which only the real components interface the application program,
a virtual-virtual mode in which one or more simulated entities respond to the application program and simulate activity or operations tracked by the mixed reality tool to produce virtual data inputs to the skill engine, and
a real-virtual mode in which the skill engine processes the system data for one or more of the real components simultaneously with data for one or more of the simulated entities;
wherein the mixed reality tool is further configured to:
modify the initial parameters in response to instructions gesture inputs received from a user;
wherein the simulator is further configured to repeat the simulating of the execution of the one or more tasks using the modified parameters; and
wherein the parameters are modified and the execution of the one or more tasks are repeated iteratively until a convergence of parameters is achieved for execution of the one or more tasks within spatial tolerance thresholds.

10. The system of claim 9,
wherein the mixed reality tool is further configured to receive an indication of an acceptable simulated execution of the one or more tasks based on the convergence of parameters;
wherein the skill engine is further configured to map the skill set to the parameters corresponding to the indication and to upload the mapping to a database.

11. The system of claim 9,
wherein the mixed reality tool is further configured to display an indication to confirm selection of the object.

12. The system of claim 9, wherein the skill set includes a task of grasping the object, and the simulator is further configured to:
set a grasp pose for a gripper of the robotic device relative to the Cartesian coordinates and the orientation coordinates of the object, wherein the grasp pose includes relative Cartesian coordinates and orientation coordinates; and
the mixed reality tool is further configured to display a virtual representation of the robotic device performing a simulated grasp of the object based on the grasp pose in the mixed reality environment.

13. The system of claim 9, wherein the skill set includes a task of placing the object, and the simulator is further configured to:
select a target location related to placement of the object;
render a display of a virtual marker at the target location;
determine Cartesian coordinates and orientation coordinates of the target location;
set a release pose for a gripper of the robotic device relative to the Cartesian coordinates and the orientation coordinates of the target location, wherein the grasp pose includes relative Cartesian coordinates and orientation coordinates; and
render a display of a virtual representation of the robotic device performing a simulated placement of the object onto the target location based on the release pose in the mixed reality environment.

14. The system of claim 13, wherein the mixed reality tool is further configured to display an indication to confirm selection of the target location.

15. The system of claim 13, wherein the skill set includes an obstacle avoidance task for a pathway the object, and the simulator is further configured to:
- identify any obstacles between the location of the object and the target location;
- set a pathway between the location of the object and the target location that avoids contact with the identified obstacles; and
- render a display of a virtual representation of the robotic device performing a simulated movement of the object along the pathway in the mixed reality environment.

16. The system of claim 9, wherein the mixed reality environment comprises one or more of the robotic device, the object, and the target being simulated by a virtual representation.

\* \* \* \* \*